Patented Apr. 8, 1947

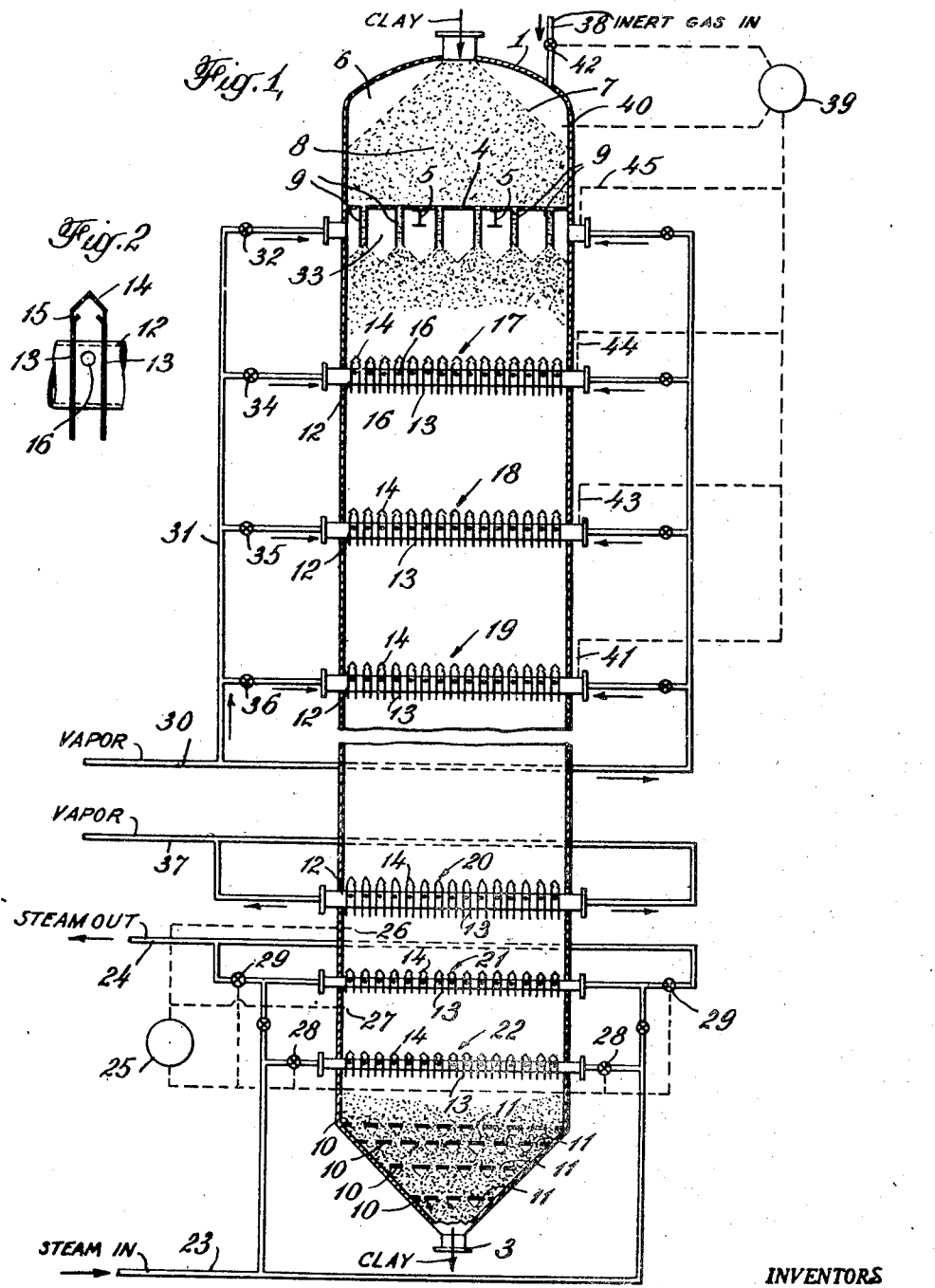

2,418,672

UNITED STATES PATENT OFFICE 2,418,672

METHOD AND APPARATUS FOR HYDROCARBON CONVERSION

Edward L. Sinclair, Philadelphia, and William A. Hagerbaumer, Brookline, Pa., assignors to Socony-Vacuum Oil Company, Incorporated, a corporation of New York Application May 27, 1943, Serial No. 488,780

6 Claims. (Cl. 196—52)

This invention has to do with methods and apparatus for the conversion of hydrocarbons in the presence of a particle-form catalytic contact mass.

As is well known, when a hydrocarbon fraction, such as a gas oil, boiling substantially between about 500° F. and 750° F., in vapor form, at temperatures of the order of about 800° F. and above, usually about 850–875° F., is brought into contact with a particle form solid contact mass of the nature of fuller's earth or related clay-like materials, a substantial conversion to gasoline occurs. This operation is typical of the operations with which this invention is concerned, and will be used herein in an exemplary manner. It is to be understood, however, that this invention is not limited thereto, but is applicable to any reaction of hydrocarbon conversions, or of treating, or to any other reaction which may be carried out in a like manner.

More recently, such reactions have been carried out in a set-up wherein the particle form solid contact mass is moved in a flowing stream cyclically through two zones, in one of which the desired reaction occurs, and in the other of which the spent contact mass material from the first zone is regenerated prior to its return to the first, or reaction zone. This invention is concerned with the reactor zone of such operations.

In such reactions, two of the variables having to do with the results to be accomplished are rate of flow of reactants through the contact mass, and amount of exposure of reactants to contact mass. It frequently becomes desirable to effect changes in some of these variables for specific purposes, and it is a major object of this invention to provide a method of handling such reactions and a reaction apparatus in which a high degree of flexibility is provided in the relative amounts of hydrocarbon and of contact mass in contact in the reaction zone.

A particular object of this invention is the provision of method and apparatus permitting the use of variable depths of contact mass through which reactants are caused to flow.

Turning to the drawing attached hereto, Figure 1 of that drawing shows in diagram form an appropriate embodiment of this invention in a reactor for such a hydrocarbon conversion. Figure 2 shows a magnified detail of a portion of the interior construction. In Figure 1, item 1 is the shell of a reactor to which particle-form contact mass material is fed by the pipe marked "clay" and from which that material is removed by pipe 3. A short distance below the top there is a partition 4, supported by beams 5, isolating the upper portion of the reactor to form a contact mass storage bin 6, partially filled, as shown by line 7, with contact mass material 8. A series of flow pipes 9 passing through partition 4 lead the contact mass material into the reactor proper, which is maintained substantially full of contact mass material. At the bottom of the reactor a series of baffles 10, 10, 10, 10 serve to assure uniform flow of contact mass material throughout the cross section of the reactor by virtue of the orifices 11 in each of the baffles, which orifices are so arranged as to first withdraw a large number of small streams of contact mass material from all parts of the reactor at the level of the uppermost baffle and then successively combine these streams into larger streams, arriving finally at a single discharge stream flowing through pipe 3.

Interspersed at several levels within the reactor there are distribution grids, all substantially alike, which grids consist, (referring to the uppermost one), of a transverse pipe 12, extended from outside the shell of the reactor upon one side to a point external to the reactor upon the other side. Within the reactor there are troughs mounted transversely to this pipe 12, and designated by numeral 13. As shown in Figure 2, each of these troughs is of an open bottomed, gable roofed form, as shown at 14 and may be equipped with slots or louvers as at 15. Communication between the interior of pipe 12 and the space under each trough 13 is achieved by some appropriate construction, such as the orifice 16. Such a grid may be used either for introduction of reactant or removal of reactant. When used to distribute fluid reactants into the reactor, reactants entering through pipe 12 and passing by orifice 16 into the space under trough 13 will pass into the reaction space through the open bottom of the trough and through such slots 15 as have been provided. When used for the removal of reactants from the reaction zone, this flow is reversed, the reactants flowing into the space under a trough 13, then into pipe 12, then out of the reactor. The downwardly moving particle form solid contact mass material flows downwardly in the spaces between the trough 13. Other types of distributor and collector grids may be used.

In Figure 1 of the drawing there are shown a series of grids, 17, 18, 19, 20, 21, 22. The lowermost grid 22 is used for the introduction of a purge medium, such as steam, brought to the reactor through pipe 23. The next higher grid, 21, is used to remove that purge medium, which, together with removed reactants, flows away through pipe 24. A control may be effected at this point by use of the differential pressure control 25, which observes the pressure at the bottom of the reaction zone, point 26, and the pressure in the purge zone, point 27, and by valves 28, 28, and, if necessary, valves 29, 29, maintains a purge zone pressure, point 27, which is not lower than and preferably equal to or slightly above the pressure at the bottom of the reaction zone point 26. In this manner, any substantial escape of reactants with emergent contact mass material may be prevented.

The reactor may be utilized by flowing the fluid reactant either concurrently with the flow of contact mass material or countercurrent thereto. In the drawing, concurrent flow is shown. Reactants entering through pipe 30 and manifold 31 are introduced optionally into a desired point, either through valve 32 into space 33 at the top, (which in this case serves as a distribution zone), or through valve 34 and grid 17, or valve 35 and grid 18, or valve 36 and grid 19. With such concurrent flow, reactants collected by grid 20 leave the reactor through pipe 37. In this manner, the reactants may be caused to pass through a bed of any desired length, and, for a uniform rate of reactant flow and a uniform rate of contact mass flow, wide variations in space velocity, (volume of reactant at some specified standard condition per unit time per unit volume of contact mass passed through), may be achieved. When, as is readily possible, variations in amount of reactant fed per unit time, and/or variations in amount of contact mass fed per unit time, are made, obviously a wide flexibility can be attained.

Similarly, by reversing the functions of pipes 30 and 37 and of the grid selected for use with pipe 30 the same variable length of contact of reactant with contact mass may be gotten while flowing the reactant countercurrently to the flow of contact mass.

Certain precautions must be taken. If, for example, grid 19 is used for reactant introduction and grid 20 for reactant removal, there is a considerable volume of contact mass above the level of inlet grid 19. Should reactant be allowed to diffuse into this contact mass, the control of space velocity would be lost to whatever degree this diffusion occurs and due to lack of provision for positive handling of the reactant in this volume of contact mass above grid 19, very serious possibilities of undesirable types of reaction arise. This can be avoided as follows: An inert gaseous medium, preferably a cooled scrubbed flue gas, is introduced into the contact mass storage chamber 6 by pipe 38. A differential pressure control instrument 39, observes the pressure in 6 at point 40, and the pressure in inlet grid 19 through connection 41, and so operates valve 42 as to keep the pressure in chamber 6 above the pressure in grid 19. Thus there is a flow of inert gas through and with the contact mass material into the reaction zone, serving to confine reactants to the reaction zone and prevent their unwanted diffusion into volumes of contact mass which are not assigned to reaction. The differential pressure utilized will be small, and it will vary with such factors as type of contact mass particle, temperature of operation, etc., but in no case will it be great enough to cause a substantial flow into the reactor zone to dilute reactants. It is so controlled that the amount of inert gas introduced is sufficient merely to act as a diffusion block, i. e., merely enough to establish a positive tendency to flow from 6 to 19 rather than the reverse.

When using any other inlet grid, as 18, 17, or the space 33, the same control may be accomplished by connecting the differential pressure control 39 to the proper point through 43, 44, 45, respectively.

When flowing reactants countercurrently, the same control may be used, except that in this case, now using 20 as the inlet for reactants and 19 as the outlet for reactants, the differential pressure which is controlled is the difference between inert gas inlet pressure and reactant outlet pressure instead of between inert gas inlet pressure and reactant inlet pressure as before.

Obviously, in both cases, once the differential pressure control is set for a differential appropriate to the contact mass and reaction conditions, it may be applied as desired to either form of reactant flow by mere manipulation of connections 41, 43, 44, 45 to ensure observation of lower pressure at the proper point.

In both methods of operation there has been achieved a flexibility of control over the amount of contact mass material brought into contact with a given amount of reactant during a unit time by flowing that reactant through a preselected portion of a moving stream of particle contact mass material while preventing access of reactants to that portion of the contact mass stream which it is not desired to use in the reaction.

We claim:

1. A reactor for the conversion of hydrocarbons in the presence of a moving stream of particle-form solid contact mass material wh'ch comprises: means defining an elongated reaction chamber, means to introduce contact material to one end thereof and means to remove it from the other end thereof, at least three reactant fluid handling means at spaced levels within said chamber, the uppermost and lowermost handling means being spaced a substantial distance from the ends of said chamber, a first external manifolding means in vapor flow communication with one of said fluid handling means located nearest adjacent to one end of said chamber, a second external manifolding means in vapor flow communication with each of the remaining reactant fluid handling means, valve means associated with said second manifolding to permit selective exclusion of vapor flow between said second manifolding and any of said remaining reactant fluid handling means, means to introduce reactant charge vapors to one of said external manifolding means, means to withdraw reactant vapor products from the other of said external manifold means, said vapor handling means and manifolding means being so arranged as to permit passage of reactant vapors through any one of a plurality of vertical sections of said chamber intermediate its ends, gas inlet means to said chamber near each end thereof, means to introduce an inert gas into each of said last-named inlets at a rate so controlled as to permit maintenance of inert gas pressure at both end sections of said chamber slightly greater than that in the portion of said chamber utilized for reactant flow.

2. In a process for catalytic conversion of hydrocarbons wherein hydrocarbon reactants in the gaseous form are passed at a constant, fixed volumetric velocity through a confined reaction zone to contact a substantially continuously moving, particle-form catalyst passed through said zone in the form of a substantially compact moving column having a fixed and constant length, the method of changing the reactant space velocity without variation of the length of said column of catalyst within said reaction zone which method comprises: selectively conducting the reactant charge as a single stream through varying fractional portions of the total column length of substantially active catalyst within said zone and maintaining an inert gas atmosphere in the remaining varying unused portion of said column.

3. In a process for catalytic conversion of hydrocarbons wherein hydrocarbon reactants in the gaseous form are passed at a constant, fixed volumetric velocity through a confined reaction zone to contact a substantially continuously moving, particle-form catalyst passed through said zone in the form of a substantially compact column of substantially active, moving catalyst having a fixed and constant length, the method of changing the reactant space velocity without variation of the length of said column of catalyst within said reaction zone which method comprises: without substantial interruption of reactant vapor flow into said moving column within said reaction zone, selectively conducting the reactant vapors as a single stream at said fixed constant volumetric rate through fractional portions of variable length of said substantially active catalyst column of fixed length moving through said zone, the length of said fractional portions being varied in inverse proportion to the desired reactant space velocities, and passing an inert gas through the remaining fractional portions of said column unused for reactant flow.

4. In a process for catalytic conversion of hydrocarbons wherein hydrocarbon reactants in the gaseous form are passed at a constant, fixed volumetric velocity through a confined reaction zone to contact a substantially continuously moving, particle-form catalyst passed through said zone in the form of a substantially compact moving column having a fixed and constant length, the method of changing the ratio of fluid reactant through-put per unit of time to the amount of catalyst having a substantial activity for said hydrocarbon conversion through which said fluid reactant passes in said reaction zone without changing the volumetric rate of reactant flow and without substantial interruption of the flow of fluid reactant to said reaction zone which comprises: selectively passing said reactant vapor as a single stream through varying fractional portions of the total moving, substantially active catalyst column length within said zone, and maintaining an atmosphere of inert gas substantially throughout the residual fractional portions of said column within said zone.

5. In a process for catalytic conversion of hydrocarbons wherein hydrocarbon reactants in the gaseous form are passed at a constant, fixed volumetric velocity through a confined reaction zone to contact a substantially continuously moving, particle-form catalyst passed through said zone in the form of a substantially compact column of substantially active moving catalyst having a fixed and constant length, the method of changing the reactant space velocity while maintaining constant the reactant volumetric velocity and constant column length within said zone which method comprises: selectively conducting said reactant through fractional portions of differing lengths of the total column length of moving catalyst having a substantial activity for hydrocarbon conversion, the length of the selected fractional portion varying inversely with the selected space velocity, and introducing to the unused portions of varying length of said column a gas which is inert to oxidation and controlling the pressure of said inert gas throughout said unused portions above that in the portion of said column selected for hydrocarbon flow.

6. In a process for catalytic conversion of hydrocarbons herein hydrocarbon reactants in the gaseous form are passed at a constant, fixed volumetric velocity through a confined reaction zone to contact a substantially continuously moving, particle-form catalyst passed through said zone in the form of a substantially compact, moving catalyst column having a fixed and constant length, the method of selectively changing the reactant space velocity while maintaining constant the reactant volumetric velocity and the length of said column within said zone which method comprises: selectively controlling the length of reactant pass through a fractional portion of said column of substantially active, moving catalyst intermediate its ends, the length of pass being selectively varied in inverse proportion to the selected reactant space velocity, and maintaining an atmosphere of a gas substantially inert to oxidation throughout the portion of said column unused for reactant flow.

EDWARD L. SINCLAIR.
WILLIAM A. HAGERBAUMER.

REFERENCES CITED

The following references are of record in the file of this patent:

UNITED STATES PATENTS

| Number | Name | Date |
|---|---|---|
| 2,239,801 | Voorhees | Apr. 29, 1941 |
| 2,270,715 | Layng et al. | Jan. 20, 1942 |
| 2,290,580 | Degnen et al. | July 21, 1942 |
| 2,301,044 | Heard et al. | Nov. 3, 1942 |
| 2,304,183 | Layng et al. | Dec. 8, 1942 |
| 2,234,505 | Schulze | Mar. 11, 1941 |
| 1,852,227 | Barstow et al. | Apr. 5, 1932 |
| 2,304,128 | Thomas | Dec. 8, 1942 |
| 1,977,684 | Lucke | Oct. 23, 1934 |
| 2,246,345 | Campbell | June 17, 1941 |
| 2,298,593 | Rubin et al. | Oct. 13, 1942 |
| 2,094,946 | Hubmann | Oct. 5, 1937 |
| 2,338,573 | Creelman | Jan. 4, 1944 |
| 2,348,156 | Shappard | May 2, 1944 |
| 2,351,214 | Kaufmann et al. | June 13, 1944 |
| 2,362,196 | Frey | Nov. 7, 1944 |
| 2,376,365 | Lassiat | May 22, 1945 |
| 1,812,446 | Mendius | June 30, 1931 |
| 2,204,003 | Rummel | June 11, 1940 |
| 2,090,159 | Smith | Aug. 17, 1937 |